United States Patent [19]

Boret et al.

[11] 4,210,519
[45] Jul. 1, 1980

[54] PROCESS AND APPARATUS FOR HYDROCARBON CONVERSION

[75] Inventors: Roger Boret, Le Pecq; Charles Bronner, Chatou; Roland Huin, Montesson-la-Borde; Andre Vidal, Le Vesinet, all of France

[73] Assignee: Intitut Francals du Petrole, Rueil-Malmaison, France

[21] Appl. No.: 966,995

[22] Filed: Dec. 6, 1978

Related U.S. Application Data

[63] Continuation of Ser. No. 741,744, Nov. 15, 1976, Pat. No. 4,133,743, Ser. No. 589,987, Jun. 24, 1975, abandoned, and Ser. No. 305,797, Nov. 13, 1972, abandoned.

[30] Foreign Application Priority Data

| Nov. 16, 1971 | [FR] | France | 71.41069 |
| Feb. 7, 1972 | [FR] | France | 72.04055 |
| Mar. 13, 1972 | [FR] | France | 72.08731 |

[51] Int. Cl.² ............... C10G 13/16; C10G 35/12

[52] U.S. Cl. .................. 208/49; 208/174; 406/146

[58] Field of Search ............ 208/173, 174, 175; 302/66, 53

[56] References Cited

U.S. PATENT DOCUMENTS

| 2,716,050 | 8/1955 | Haperbaumer | 208/174 |
| 3,725,248 | 4/1973 | Greenwood et al. | 208/138 |
| 3,839,196 | 10/1974 | Plackmann et al. | 208/174 |

Primary Examiner—Herbert Levine
Attorney, Agent, or Firm—Millen & White

[57] ABSTRACT

Continuous process for converting hydrocarbons in the presence of a granular catalyst including a metal from group VI a, VII a or VIII, deposited on a carrier, comprising passing a charge of hydrocarbons with hydrogen through a series of at least two vertical catalytic zones in which the catalyst bed moves progressively downwardly, withdrawing progressively the catalyst from the bottom of the last catalytic zone, and reintroducing the same, after regeneration, at the top of the first catalytic zone.

6 Claims, 5 Drawing Figures

PROCESS AND APPARATUS FOR HYDROCARBON CONVERSION

This is a continuation, of application Ser. No. 741,744 filed on Nov. 15, 1976; now U.S. Pat. No. 4,133,743, Ser. No. 589,987 filed on June 24, 1975 and Ser. No. 305,797 filed on Nov. 13, 1972 both now abandoned.

This invention concerns a process for hydrocarbon conversion; it relates more particularly to a hydrocarbon hydroreforming process; it also concerns the production of aromatic hydrocarbons, for example the production of benzene, toluene and xylene (ortho, meta or para), from gasolines either unsaturated or not, e.g. cracking, pyrolysis, particularly steam-cracking or catalytic reforming gasolines, or still from naphthenic hydrocarbons which, by dehydrogenation, may be converted to aromatic hydrocarbons.

The invention also relates to the corresponding apparatuses.

Many processes are known whereby the above-mentioned hydrocarbon conversion may be carried out. For example, as far as the hydroforming processes are concerned, many operating manners are possible:

First of all, it is possible to proceed with a stationary catalyst bed with the use of one or more reactors. When using several reactors the feed passes successively through each of the reactors; the catalyst remains in service over long periods but its activity decreases during time, which requires a progressive increase of the temperature of the reactors in order to compensate said activity decrease, and this results in a variable selectivity during the operation cycle. Moreover, during the regeneration, the reactors are all by-passed and accordingly the production of the plant is completely interrupted. Such processes, in which the regeneration of the catalyst is only performed after long periods of service of the catalyst are called "non regenerative" processes.

In another process, which is called "regenerative", the catalyst is on the contrary regenerated either frequently or continuously:

(a) the frequent regeneration is convenient when using several reactors containing the catalyst in fixed bed. When one of these reactors is in regeneration (or waiting) period, the other reactors are in operation; this reactor subsequently replaces one of the reactors in operation when the catalyst thereof is submitted to a regeneration, and by this way, all the reactors are alternatively by-passed for regeneration and then, again put into service without interrupting the operation of the unit;

(b) in the case where only one reactor is used, it is of course impossible to make use of a regenerating process with a frequent regeneration, since otherwise the industrial unit would be very frequently stopped; it has thus been proposed (if the above-indicated solution of "non regenerative" process is not chosen) to regenerate permanently the catalyst; the catalyst flows downwardly from the reactor and the regeneration is carried out, for example in a continuous manner, in a auxiliary reactor so as not to interrupt the reaction.

Conventionally, it is preferred not to maintain the catalyst in service during long periods, since, as above-mentioned, these long periods result in a decrease in activity of the catalyst which generally contains a noble metal of the platinum family. More and more, it is preferred, accordingly, to make use of the so-called "regenerative processes".

It must be observed, on the one hand, that the use of a system with several reactors according to paragraph (a) above, applicable to catalysts of the noble metal type, particularly platinum, requires the use of a very complex apparatus, with in particular a high cost of the valves and ducts; moreover, the frequent adjustments required for putting into service and stopping a reactor (which result in a production loss) make the application of such a system rather unsatisfactory on an economical point of view. On the other hand, the use of a single reactor, paragraph (b) above, with a continuous regeneration of the catalyst, was not conceivable up to now for the catalysts containing a noble metal from group VIII of the periodic classification of the elements and was only applicable, until now, to catalysts of the oxide type, e.g. molybdenum, cobalt or chromium oxides, whose regeneration by mere burning of the carbonaceous deposits does not involve any problem and is easily carried out and the possible attrition of which results in unexpensive losses. Moreover at the present time, the system comprising several reactors are preferred to those comprising a single reactor. It was accordingly important to provide really satisfactory solutions.

The present invention now makes possible to carry out continuously under very satisfactory conditions, various hydrocarbon conversions, in the presence of a catalyst containing at least one metal selected from the group consisting of the metals of groups VI a, VII a and VIII of the periodic classification of the elements, by using a system comprising several reactors in series, placed side to side, the catalyst particles circulating successively through each of the different reactors, in addition to a regeneration zone operated simultaneously with the hydrocarbon conversion reaction.

The present invention also concerns various apparatuses for carrying out the process.

The process and the apparatuses of the invention offer the advantage of making it possible to operate under much more severe conditions (particularly, at lower pressures and for the production of reformates of higher octane number) than according to usual processes and moreover, to obtain a noticeable yield increase due to the operation in the presence of a frequently regenerated catalyst which, accordingly, is more selective.

The process and the apparatuses of the invention have, in addition, the following advantages:

Selection of the activity level as a function of the quality of the charge and of the severity of the operation.

Suppression of the idle times which correspond to the regeneration periods of the prior "non-regenerative" system.

Possibility of a frequent checking of the catalyst state so as to adapt the regeneration treatment thereto.

Advantages also as compared to the systems with superimposed catalyst beds, interconnected through catalyst conveying conduits, in which a partial passage of the charge occurs with the corresponding liability of uncontrolled reactions.

Other advantages will be made apparent from the following description and examples given hereinafter.

All these advantages are achieved, according to the invention, by a process for hydrocarbon continuous conversion, in the presence of a granular catalyst containing a carrier and at least one metal selected from the group consisting of the metals from groups VI a, VII a and VIII of the periodic classification of the elements, remarkable in that the charge formed of hydrogen and hydrocarbons is circulated through a reaction space consisting of at least two elementary catalytic zones, placed in series, substantially vertically and side to side, each of which is of the moving bed type (the term "moving bed type" will be explained hereinafter), the charge circulating successively in each zone and progressively flowing for example downwardly through each zone, and in that the catalyst in grains is progressively withdrawn from the bottom of the last catalytic zone, and is fed to the regeneration zone, from the outlet of which the regenerated catalyst in grains is progressively reintroduced at the top of the first catalytic zone of the reaction space so as to maintain a high and substantially constant activity level at any point of the catalytic zones.

(In some cases, it is possible to have the reaction space according to the invention preceded by a reaction space comprising at least one conventional reactor with a stationary bed, thus operated independently from the reaction space according to the invention: in this case, on the one hand, the charge first circulates through one or more reactors with a stationary bed, then penetrates the reaction space according to the invention, i.e. the reaction space formed of at least two catalyst zones of the moving bed type, and on the other hand, the one or more reactors with a stationary bed are filled up with a catalyst which is regenerated at the convenient time, this catalyst being either identical or different from the catalyst which circulates, according to the invention, in each of the catalytic zones of the reaction space. Such a type of arrangement is that used in example No 6 illustrated by FIG. 4).

According to an alternative embodiment of the process, the hydrocarbon conversion reaction may be started in a first catalytic space consisting of at least two elementary catalytic zones from which the catalyst in grains is withdrawn for a continuous regeneration; subsequently the catalyst is introduced into a second catalytic space where the treatment of the charge is continued. When operating according to this embodiment, the process of the invention is then characterized by the fact that the regenerated catalyst, before being reintroduced into the first catalytic zone of the first reaction space, is first progressively introduced into a second reaction space through one of the two ends of said second reaction space in which the treatment of the charge issuing from the first reaction space is continued, and then by the fact that the catalyst is progressively withdrawn from the other end of said second reaction space and finally progressively reintroduced into the first reaction space. In such a case, the second reaction space may optionally consist of several catalytic zones, place side by side and connected in series.

The catalytic space (or spaces) may be maintained at a constant activity and selectivity level by withdrawing the catalyst from each catalytic zone of the reaction space, and optionally of the second reaction space, if any, at a convenient rate and frequency.

The withdrawal of the catalyst is carried out as indicated above by the term "progressively". This term means that the catalyst may be withdrawn:

either periodically, for example at a frequency of from 1/10 to 10 days, by withdrawing a single fraction at the same time, for example from 0.5 to 15% of the total catalyst amount. However it is also possible to withdraw this catalyst much more frequently (for example every minute or second), the withdrawn amount being reduced in proportion;

either in a continuous manner.

It has been stated that the catalytic zones of the reaction space (and optionally the one or more zones of the second reaction space when it does exist) are placed side by side; the devices and various arrangements required for regenerating the catalyst and for the various treatments to which the latter may be subjected between the various catalytic zones, may be positioned according to the case, either above or even below, one of the catalytic zones or still on the side of any one of said catalytic zones. It is therefore necessary, more or less frequently according to the relative position of the catalytic zones and of the various above-mentioned devices and fittings to ensure the periodic transportation of the catalyst from a relatively low level to a relatively high level. The catalyst circulation from the bottom of a catalytic zone to the top of another catalytic zone of the reaction space, optionally from the bottom of the last catalytic zone of the reaction space to the regeneration zone and still optionally (when necessary and according to the relative position, with respect to one another, of the first reaction space, of the regeneration zone and, if any, of a second reaction space), from the regeneration zone to the top of the first catalytic zone of the reaction space, from the regeneration zone to the second reaction space and from the second reaction space to the top of the first catalytic zone of the first reaction space, is carried out by means of any known lifting device which in the following description and claims will be called "lift". The fluid of the lift, used for conveying the catalyst, may be any convenient gas, for example nitrogen, hydrogen and, more particularly, purified hydrogen; but it has now been discovered that it would be very advantageous to make use, as driving fluid, of recycle hydrogen which offers the advantage of, for example, avoiding the introduction of various impurities; it has been observed moreover that nitrogen, for example, may, after a long time, become noxious for the catalyst. In addition, the use of a gas such as nitrogen makes it necessary to make use of a system for separating the catalyst from nitrogen in order to avoid, on the one hand, the introduction of nitrogen itself which is undesirable in the type or reactions carried out according to the process of the invention and, on the other hand, the introduction of the nitrogen impurities. Preferably, the hydrogen is maintained at a temperature from about 150° to 550° C., preferably from 390° to 530° C., in order to avoid thermal shocks on the catalyst; the use of hot hydrogen results moreover in a hydrogen saving since hot hydrogen has a greater volume than cold hydrogen, so that the hydrogen consumption is lower.

Generally the rate of the catalyst withdrawal is substantially the same in the different reaction zones or spaces.

The solid which is displaced from a catalytic zone to another catalytic zone, and toward the regeneration zone may be a granular catalyst containing a suitable carrier: this catalyst may be in the form of spherical balls having a diameter generally from 1 to 3 millimeters, preferably from 1.5 to 2 mm, these values being however not limitative. The density in bulk of the catalyst is generally from 0.4 to 1, preferably about 0.5 to 0.9 and more particularly from 0.6 to 0.8, these values being not limitative.

Figure 1:
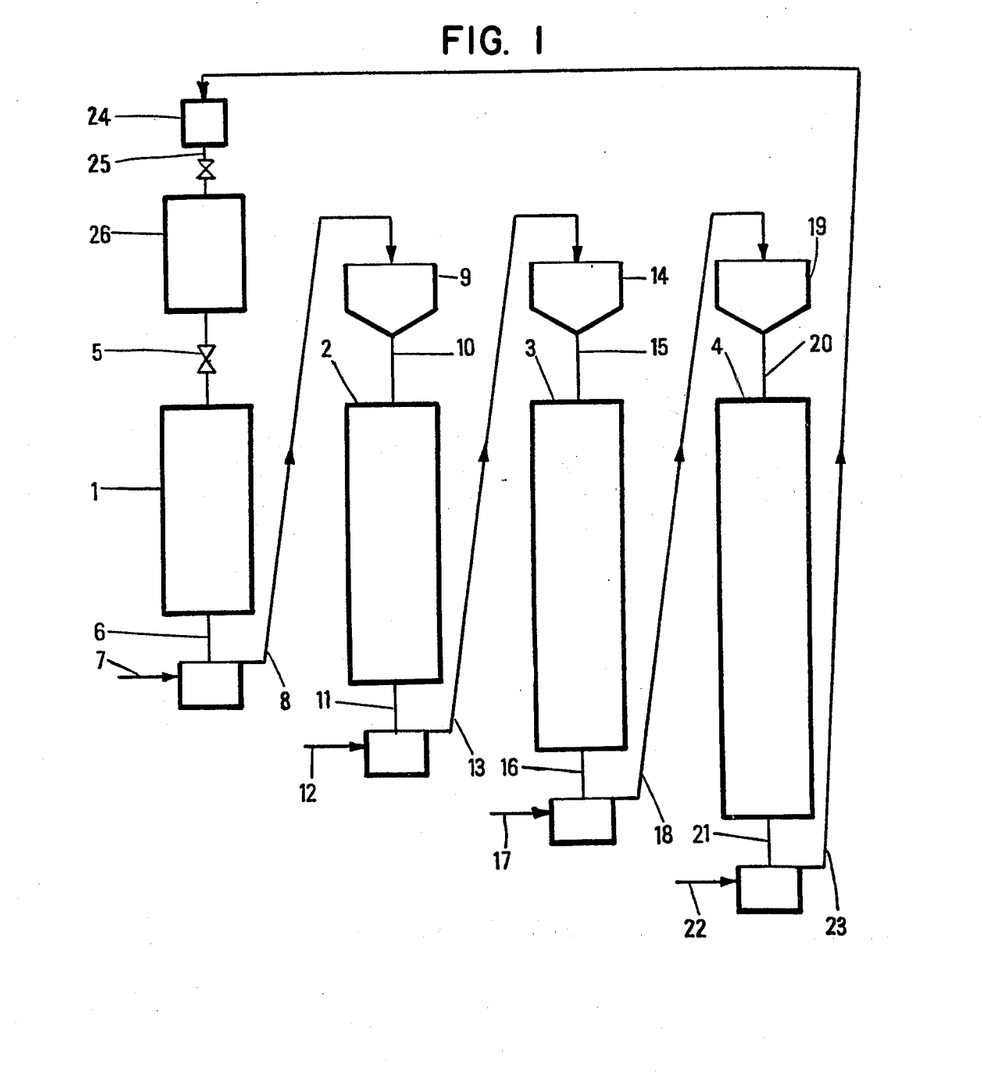
FIGS. 1 to 5 illustrate the invention but are not limitative thereof.
Figure 3:
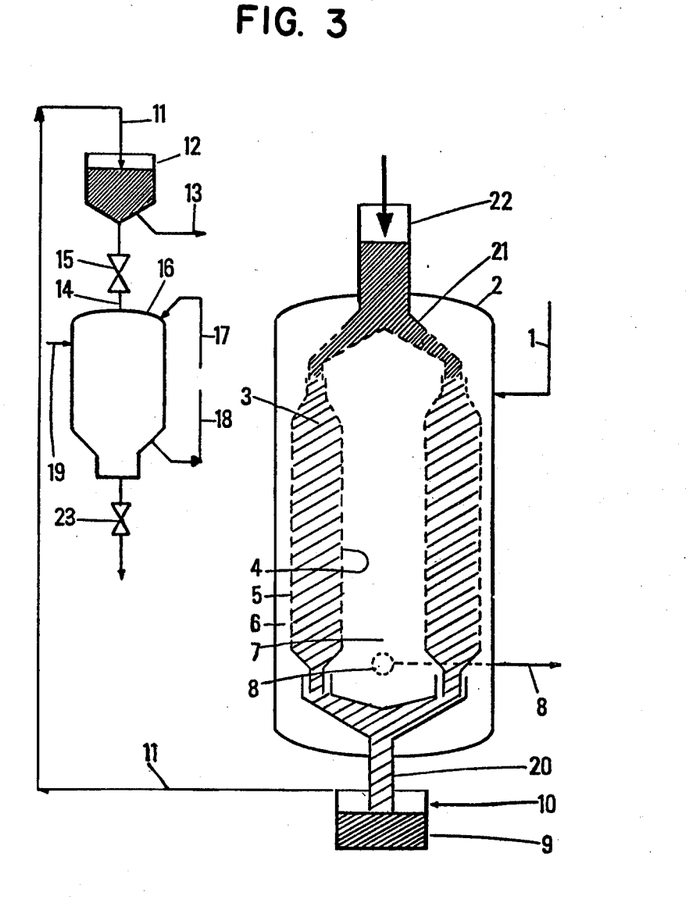

The reaction space from which is withdrawn the catalyst, which is destined to be conveyed subsequently toward the regeneration units, is accordingly constituted of at least two elementary catalytic zones. These catalytic zones are placed in series, each one being formed of a catalytic enclosure containing a catalyst bed slowly moving down continuously or slowly moving down periodically, in the form of an uninterrupted column of catalyst grains (in the following description and claims, such zones will be conventionally referred to as "moving bed type" zones). The feed charge circulates in each zone successively, generally in a radial flow, from the center to the periphery, or from the periphery to the center. The FIG. 3 illustrates what is meant by "radial" flow. These catalytic zones being thus placed in series, the charge flows successively through each of these elementary catalytic zones, and an intermediary heating of the charge is provided between the successive elementary catalytic zones; the catalyst is introduced at a top of the zone where the fresh charge is introduced; thereafter it flows downwardly progressively through said zone, from the bottom of which it is withdrawn and, by any convenient means (in particular a lift) it is conveyed to the top of the following elementary catalytic zone in which it progressively flows downwardly, and so on, up to the last catalytic zone from the bottom of which the catalyst is also progressively withdrawn and thereafter sent to the regeneration zone. FIG. 1 illustrates this type of lay out with four catalytic zones in series.

When, after the regeneration of the used, or partially used, catalyst, the regenerated catalyst is optionally sent to a second reaction space before being fed back to the first reaction space, the second reaction space may consist, at will, either of a single reactor, or of an assembly of at least two elementary catalytic zones, which are placed in series as above-mentioned.

It will be noted that the second reaction space may be placed below the regenerator so that the catalyst may flow by its own weight from the regenerator to the second reaction space. However it is of course also possible to place the second reaction space on the side of the regenerator, in which case the regenerated catalyst is raised up through a lift to the top of the second reaction space, by means, for example, of the hydrogen used for reducing the regenerated catalyst. The regenerated catalyst flows through the second reaction space at a rate adapted to the treatment conditions. It is then progressively withdrawn and raised up by a lift to the first reaction space.

As far as the reaction space formed of several elementary catalytic zones in series is concerned, it is preferred, in certain cases, that the average temperatures in each of the catalytic zones be progressively increasing in the direction of the charge flow. In addition, according to the case, it is preferred that the volume of the elementary catalytic zones be increasing in the direction of the general flow of the charge and of the catalyst in order to compensate for the constantly decreasing activity level of the catalyst but, in other cases, it is advantageous that the volume of the catalytic zones be increasing in the direction of the general flow of the charge but increasing in the direction of the general flow of the catalyst. In the latter case, it may be advantageous to makke use of at least three elementary catalytic zones.

As far as the catalyst regeneration itself is concerned, it may be carried out by any known means. But it has been discovered that a particular method for carrying out the catalyst regeneration was particularly advantageous (this method could also be used in the process in which the reaction space would consist of a single catalytic zone but it appears also very efficient when the reaction space comprises several reaction catalytic zones), said method consisting of introducing the granular catalyst to be regenerated, progressively withdrawn from the last catalytic zone of the reaction space, into an accumulator flask, then introducing the catalyst, batchwise, into the regeneration zone itself and subsequently regenerating the catalyst, arranged in fixed bed, in three successive steps: the catalyst in the regeneration zone itself, arranged in a fixed bed, is successively:

(a) subjected to a combustion by means of a molecular oxygen containing gas;

(b) subjected to an oxychlorination by means of both a gas containing molecular oxygen and a halogen or a halogenated compound, for example a halohydric acid or an alkyl halide;

(c) subjected to a final treatment by means of a gas containing a high proportion of molecular oxygen.

Generally, the preferred way of carrying out the regeneration is as follows: the used or partially used catalyst issuing from the last catalytic zone of the reaction space, is raised up through a lift towards an "accumulator-decantor" flask, generally placed above the regenerator. The fluid of the lift, used for conveying the catalyst, is preferably recycle hydrogen.

In the "accumulator-decantor" flask, the hydrogen is separated from the catalyst and optionally sent to a filter for removing the fine particles of catalyst and, from there, towards the compressor for recycling the hydrogen towards the reaction space or towards the lifts. The used or partially used catalyst accumulates in the "accumulator-decantor" flask before feeding the regenerator, generally placed below this flask. At regular intervals, the regenerator pressure is balanced, for example under hydrogen atmosphere, with that of the "accumulator-decantor" flask. The regenerator is then filled up with the catalyst of the "accumulator-decantor" flask, fed through a system of valves, then isolated from the rest of the system. The regenerator is then scavenged with nitrogen for removing the hydrogen and hydrocarbons. After that, the regeneration itself is then carried out on a stationary bed, in three successive steps:

The first step corresponds to the combustion of the coke deposits. This operation is carried out by air injection into an inert mixture (consisting for example of nitrogen and carbon dioxide), this inert mixture being used as thermal diluent. The oxygen content of the injected regeneration gas is preferably from 0.01 to 1% by volume. The injected air is consumed by the combustion of the coke deposits and the end of the combustion is made easily apparent by the increase of the oxygen content in the gas outflow from the regenerator and also by the disappearance of the flame front (horizontal plane where the combustion occurs) which propagates downwardly through the catalyst bed. The combustion is conducted at an average temperature preferably from 350° to 550° C. and under a pressure of, for example, 1 to 15 kg/cm$^2$.

The second stage corresponds to the oxychlorination of the catalyst; in order to carry out this oxychlorination, the oxygen content of the regeneration gas introduced into the regenerator is increased up to a value of from 1 to 3% by volume, by simultaneously introducing a halogen compound, i.e. a halogen or a halohydric acid, or preferably an alkyl halide containing from 1 to 6 carbon atoms per molecule and, preferably, carbon tetrachloride; the proportion of alkyl halide is such that this alkyl halide may form 0.5 to 1.2% by weight of an alumina halogenated derivative with respect to the catalyst subjected to the regeneration. (It is also possible to make use of mixtures of halogenated compounds, for example, a mixture of chlorine and hydrochloric acid, or preferably a mixture of carbon tetrachloride and hydrochloric acid, this latter mixture containing about 5 to 60% of hydrochloric acid and 95 to 40% of carbon tetrachloride. Other halogenated compounds, for example such compounds as thionyl chloride or nitrosyl chloride may also be used).

The oxychlorination is conducted at an average temperature of from 350° to 550° C. and under a pressure of from about 1 to 15 kg/cm². This treatment is continued over a period, for example, from 20 minutes to 3 hours, generally over about 1 hour.

The third step of regeneration corresponds to the oxidation of the catalyst: for carrying out the same, the oxygen content of the regeneration gas fed to the regenerator is increased up to a value of from 3 to 20% by volume and the regenerator is subsequently maintained at an average temperature of from 350° to 550° C. and at an average pressure from 1 to 15 kg/cm². The duration of this operation is for example from 30 minutes to 6 hours, and preferably from 40 minutes to 2 hours. More particularly it is about 2 hours.

After the third step, the regenerator is scavenged with nitrogen and, subsequently, balanced in pressure, for example under hydrogen atmosphere, with the reaction zone in which the catalyst will be injected. The catalyst is then transferred from the regenerator to the reaction zone through a valve system. But, before reaching said reaction zone, the catalyst first accumulates in a space, separate from the reaction zone, (i.e. through which no hydrocarbon reaction mixture is passed) where it is reduced by means of a hydrogen stream, at a temperature from 350° to 550° C., and a pressure from 3 to 25 kg/cm², preferably from 5 to 20 kg/cm². (The catalyst sulfurization in the case where it is necessary to proceed to such a sulfurization, may be carried out within said space). Subsequently, the fresh (and reduced) catalyst progressively feeds the reaction zone as the used catalyst is withdrawn.

The reactions to which the process of the invention is applicable have been indicated at the beginning of the specification and may be substantially divided in two groups:

(1) On the one hand, the reforming reactions.

The general conditions of the catalytic hydroreforming reactions are as follows: in a reaction space the average temperature is from about 450° to 580° C., the pressure from about 5 to 20 kg/cm², the hourly rate is from 0.5 to 10 volumes of liquid naphtha per catalyst volume and the recycling rate from 1 to 10 moles of hydrogen per mole of charge.

By way of mere illustration, there will also be mentioned:

Charge: naphtha distilling in the range of from about 60° C. to about 220° C., particularly naphtha from straight run distillation.

Catalyst: it contains at least one metal from the platinum family, i.e. a noble metal such as platinum, palladium, iridium, ruthenium, osmium, rhodium or mixtures of noble metals deposited on a carrier of alumina or an equivalent compound (examples: platinum-alumina-halogen or platinum-iridium-alumina-halogen). The total content of noble metals is from 0.1 to 2% by weight and the content of halogen, preferably chlorine or fluorine, from 0.1 to 5%. The association alumina-halogen may be replaced by other carriers, for example, alumina-silica.

(2) On the other hand, the reactions producing aromatic hydrocarbons from unsaturated or not gasolines.

In the case of an unsaturated charge, i.e. a charge which contains diolefins and monoolefins, the latter must be removed therefrom: in such a case, it must be observed that the unsaturated charge is first subjected to a selective hydrogenation whereby diolefins and alkenylaromatics are converted to monoolefins and alkylaromatics respectively, in the presence of a conventional hydrogenation catalyst, or of a mixture of such catalysts, for example a metal, or a sulfide or oxide of a metal from groups VI and/or VIII, for example tungsten, molybdenum, nickel, cobalt or palladium, preferably nickel. The reaction conditions vary according to the type of catalyst used. The temperature may be from $-20°$ to 250° C., the pressure from 1 to 90 kg/cm², and the hydrogen amounts from 0.2 to 3 moles per mole of charge. Subsequently, after separation of the $C_5$ hydrocarbons and of the hydrocarbons with a number of carbon atoms greater than 8, the $-C_6-C_7$ and $-C_8$ cut is subjected to a hydrogenation-hydrodesulfurization whereby the monoolefins are converted to paraffins and the charge is desulfurized in the presence of a catalyst which may be the same as in the preceding stage, and which is preferably a cobalt-molybdenum catalyst, this catalyst being preferably deposited on a non-cracking carrier, for example alumina. In this stage, the temperature is from 250° to 450° C., and the pressure from 10 to 80 kg/cm², with 0.2 to 3 moles or more of hydrogen per mole of charge. The sulfur content of the product at the outlet from the reactor, must not be greater than about 20 parts per million of parts by weight in order not to alter the catalyst of the following step.

The charge, optionally made free, by hydrogenation, from substantially all the diolefins and monoolefins contained therein, if any, and which generally, at this stage, contains from about 60 to about 85% of aromatic hydrocarbons, is fed, according to the invention, to a reaction space consisting of at least two successive reaction zones, where it is subjected to a hydrogen treatment, in the presence of a catalyst containing at least one metal from group VIII and/or also at least one metal from groups VI a and VII a of the periodic classification of the elements, at a temperature of about from 530° to 600° C., under a pressure from 1 to 60 kg/cm², the hourly flow rate by volume of the liquid charge being of from about 0.1 to about 10 times the catalyst volume, the molar ratio hydrogen-hydrocarbons being of from about 0.5 to about 20. The catalyst, as used here, is a bifunctional catalyst, i.e. a catalyst comprising both an acid function (of the carrier) and a dehydrogenation function; the acid function is performed by acid compounds such as alumina or chlorinated and/or fluorinated alumina, or other similar compounds such for example as silica-alumina, silica-magnesia, silica-thoria, alumina-magnesia etc . . . The dehydrogenation function is performed by at least one metal selected from the group consisting of the metals from groups VI a, VII a and VIII of the periodic classification of the elements, such as platinum, iridium, ruthenium, palladium, rhodium, osmium, nickel, cobalt, rhenium, optionally sulfurized, tungsten and molybdenum, deposited on an acid carrier. Optionally, there can be used simultaneously another metal such as gold or silver. The best results are obtained by associating two or even three of these different metals, in particular:

platinum and iridium
platinum and ruthenium
platinum and rhenium
platinum and tungsten
iridium and ruthenium
rhenium and tungsten
iridium and tungsten
ruthenium and tungsten
iridium and rhenium
ruthenium and rhenium
molybdenum and rhenium
platinum and molybdenum
platinum, iridium and ruthenium
iridium, rhenium and ruthenium
platinum, rhenium and tungsten.

The catalyst weight content of dehydrogenating metal or metals is generally from about 0.01 to 5%, advantageously from 0.05 to 1% and preferably from about 0.1 to 0.6%. The catalyst may further contain up to about 10% by weight of halogen.

The atomic ratio of the main metal to the one or more associated metals may be chosen at will.

The texture characteristics of the acid catalytic carrier are also important; in view of operating with high enough spatial velocities and avoiding the use of reactors of a too large capacity and the use of an excessive amount of catalyst, the specific surface of the carrier has to be selected from 50 to 600 m$^2$/g, preferably from 150 to 400 m$^2$/g.

During the treatment of the charge:

The iso and normal paraffins are cracked mainly to propane, butane and isobutane, to a lesser extent to pentane, isopentane, hexane and isohexane and in a complementary manner to ethane and methane.

The naphthenes are dehydrogenated to aromatics and provide the necessary hydrogen amount for cracking paraffins.

The aromatics are substantially unchanged.

Figure 2:
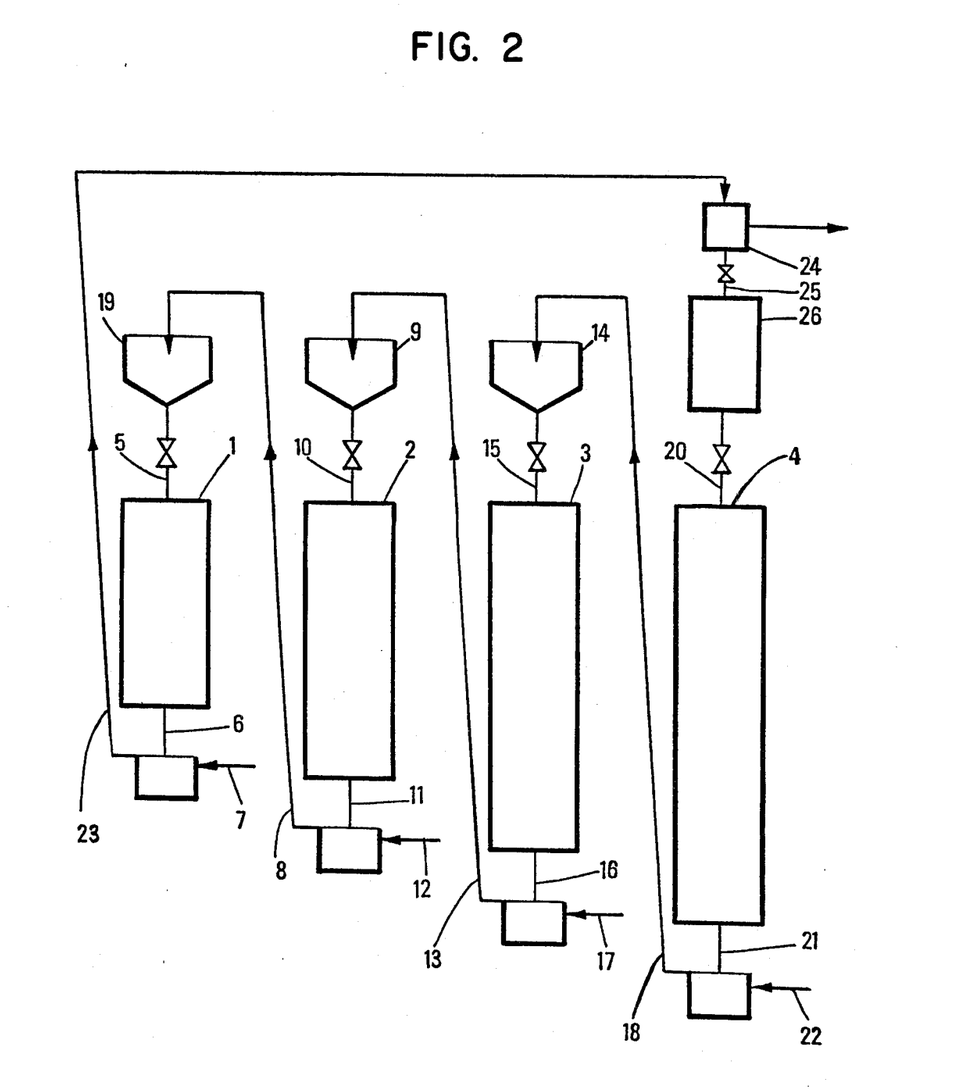

FIGS. 1 and 2, illustrate two embodiments of the invention. In each of these embodiments, the hydrogen conversion is performed in reaction zones of the "moving bed type" referenced 1, 2, 3 and 4.

In FIGS. 1 and 2, showing four reactors, the path followed by the charge has not been shown for sake of clarity; the charge is fed to the top position of reactor 1 and is discharged from the bottom, from which it is reintroduced into the top portion of the reactor 2 and subsequently, in the same manner, with respect to the reactors 3 and 4. Between two consecutive reactors, the charge passes through heating means. The assembly of the four reactors 1, 2, 3 and 4 constitutes what has been precedingly called the "reaction space", each one of the reactors forming what has been called a "catalytic zone".

In FIG. 1, the four reactors 1, 2, 3 and 4 of increasing volume, are connected in series. The catalyst introduced through duct 5 equipped with a valve system at the top of reactor 1, is withdrawn through at least one duct 6 and fed to the vessel 9, placed at the top of the reactor 2, through a lift 8, whose driving fluid is recycle hydrogen from the reaction section, introduced through duct 7. The catalyst contained in the vessel 9 is introduced at the top of reactor 2 through duct 10. (The vessel 9 and the one or more ducts 10 may be, in some cases, integral parts of reactor 2). The catalyst follows, in the same way, the path through reactors 2, 3 and 4. The used catalyst, withdrawn through at least one duct 21 at the bottom of reactor 4, is raised up through lift 23 whose driving fluid is recycle hydrogen, towards an "accumulator-decantor" flask 24 and from there towards the regeneration zone 26, through a valve system. After the regeneration has occured, the catalyst is sent back to the top of the reactor 1, after having been preliminarily subjected to a reduction with hydrogen in a vessel, not shown on the figure, placed upstream the reactor 1.

It happens in some cases, that the "accumulator-decantor" flask 24, the regeneration zone 26 and optionally also the vessel in which the regenerated catalyst is subjected to a reduction, instead of being placed above the reactor 1 as indicated in FIG. 1, are placed aside this reactor 1 (in this case, a supplementary lift is obviously necessary to transfer the catalyst to the top of reactor 1).

In the process illustrated in FIG. 2, the volume of the catalytic zones (reactors 1, 2, 3 and 4) increases in the direction of the general flow of the charge (the path of which is not shown for sake of clarity), but decreases in the direction of the catalyst flow (reactors 4, 3, 2, 1).

Apart from the different paths of the catalyst, the principle of FIG. 2 is not substantially different from the principle of FIG. 1; the only further requirement in some cases, is the presence of additional valves, respectively between, on the one hand, the vessels 19, 9 and 14, and on the other hand the reactors 1, 2 and 3. On FIG. 2, the catalyst regeneration device has been placed above the reactor 4, but it is also possible to place it on the side of one of the reactors. It suffices, in this case, to provide for an additional lift for conveying the catalyst from the regeneration zone to the top of reactor 4.

It must be noted that, on FIGS. 1 and 2, the "accumulator-decantor" flask 24 has been shown of small size as compared with the regeneration zone 26, but the "accumulator-decantor" flask may be of a much greater size and in practice the size of this flask is as great as that of the regeneration zone.

FIG. 3 is given for a better understanding of the way of operation of a "radial" catalytic zone. On this FIG. 3, there are exclusively shown, for sake of clarity, the last one of the radial catalytic zones of the reaction space, i.e. that zone from which is withdrawn the catalyst destined to feed the regeneration zone. This FIG. 3 moreover illustrates the carrying out of the preferred regeneration method described above. In FIG. 3 showing a radial reactor 2 (or a radial catalytic zone 2), the catalyst bed is in the form of a vertical cylindrical ring 3, limited, at the inside, by a grid 4 retaining the catalyst and, at the outside, either by the wall of the reactor and "scallops" (or shells), or by another grid 5 of the same type as the internal grid. The reactants, issuing from the preceding reactors, not shown, are fed to the top of the reactor through duct 1, and are distributed throughout the catalyst mass, either by the "scallops", or by an empty space 6 provided between the external grid 5 retaining the catalyst and the reactor wall. The circulation through the catalyst mass, in this case, is performed from the exterior towards the interior, substantially along the radii of the reactor (for this reason, the reactor is called "radial reactor"); after having passed through the catalyst bed, the reactants are gathered in a vertical cylindrical manifold 7, through the internal grid 4 retaining the catalyst and a slightly perforated plate, not shown on the figure, destined to provide a better distribution of the reactants through the catalyst bed by avoiding the formation of preferential paths therethrough. The reactants leave the catalyst through the duct 8 diagrammatically shown in cross-section for sake of clarity of the figure.

The catalyst introduced in the catalytic zone 2, issues from a preceding catalytic zone by a lift, not shown on the figure. The catalyst, before entering the reactor 2 through a device 21 of the distributing funnel type, first passes through a vessel 22 ("buffer-vessel"). The distributing funnel 21, on FIG. 3, is placed inside the reactor 2 but it may also be as well external thereto.

The used catalyst discharged from duct 20 (the duct 20 being here in the form of a collecting funnel, placed inside the reactor; but such a collecting funnel may be external and not internal to the reactor) into a collecting tank 9 is raised up towards an "accumulator-decantor" flask 12 through a lift 11 whose driving fluid admitted through duct 10 is recycle hydrogen from the reaction zone. The "accumulator-decantor" flask 12 is placed above the regenerator 16. In this flask, the hydrogen, after separation from the catalyst, is sent through the pipe 13 to the recycling compressor of the reaction zone, optionally through a filtration system for retaining the fine particles of catalyst. At regular intervals, the regenerator 16 is balanced in pressure, for example under hydrogen atmosphere, with the "accumulator-decantor" flask 12 and is subsequently filled up with used catalyst issued from this flask through duct 14 and the valve system 15. The regenerator 16 is then isolated from the rest of the system, scavenged with nitrogen and the regeneration is conducted therein on a fixed bed of catalyst in three successive steps as above explained. The air or the mixture air-inert gas is introduced through pipe 17 and withdrawn through pipe 18 towards a compressor and thermal exchange means, not shown on the figure, in view of a recycling through pipe 17. The used halogenated compound (for example carbon tetrachloride) is introduced through pipe 19. But in some cases the pipe 19 may be omitted and the halogenated compound is then introduced through pipe 17. In some cases also, the halogenated compound is introduced through both pipes 19 and 17. When the third regeneration step is completed, the regenerator is cleaned with nitrogen and filled with hydrogen (the admission ducts for nitrogen and hydrogen are not shown on FIG. 3) in pressure equilibrium with the first catalytic zone of the reaction space in which the regenerated catalyst must be reintroduced. The regenerated catalyst is then discharged from the regenerator 16 through a duct and a valve system 23. The regenerated catalyst is first introduced into the vessel which is used as catalyst accumulator and in which is carried out the reduction of the catalyst by means of a hydrogen stream at a given temperature (this vessel is placed either above, or aside the first catalytic zone of the reaction space). This hydrogen stream, after its use for carrying out the reduction of the regenerated catalyst, may be sequently fed to the catalytic zone where the regenerated catalyst will be introduced; the regenerated catalyst which has just been reduced is progressively introduced into that catalytic zone, in proportion to the withdrawal of the used or partially used catalyst, through duct 11 toward the regeneration zone.

In relation with FIG. 3 and more particularly with the reactors, it will be noted that the distribution funnel and the collecting funnel may be optionally external to the reactor. It is thus possible, if so desired, to make use initially of reactors of the type shown on FIG. 3 with a catalyst stationary bed, consequently to operate according to the conventional art, and subsequently, by the mere addition of distribution and collecting funnels and lifts, to transform a device with conventional stationary bed reactors to a device with "moving bed" reactors according to the invention.

The following non limitative examples 1, 2 and 3, clearly show the interest of the embodiments illustrated in FIGS. 1 and 2, as compared to a conventional non-regenerative system (see example 4 given by way of comparison in which there are used several stationary bed reactors, connected in series which are alltogether simultaneously stopped (stopping of the unit), at regular time intervals for the catalyst regeneration).

In examples 1 to 3 and in the comparative example 4, the treated gasoline had the following characteristics:

| | |
|---|---|
| - Distillation ASTM | 80° C.–163° C. |
| - $D^4{}_{15}$ | 0.738 |
| - Paraffins | 66% by volume |
| - Naphthenes | 27% by volume |
| - Aromatics | 7% by volume |

The operating conditions were such as to obtain in each of the examples according to the invention and in the comparative examples, a reformate having a "clear" octane number of 99. In each of the reactors, the average inlet temperature was 500° C., and the feeding rate was of 2 volumes of liquid charge (at 15° C.) per volume of catalyst and per hour. The hydrogen recycling rate was 6 moles of hydrogen per mole of charge. Except in the reactors of example 4, in which the pressure was an absolute pressure of 16 kg/cm$^2$, the pressure in the reactors used in the other examples 1 to 3 was only an absolute pressure of 11 kg/cm$^2$. The catalyst contains 0.35% by weight of platinum with respect to the carrier which consists of alumina having a specific surface of 240 m$^2$/g and a pore volume of 57 cc/g. The catalyst further contains 0.05% of iridium by weight. The chlorine content of this catalyst is 1%.

EXAMPLE 1

This example relates to the unit illustrated in FIG. 1; this unit comprises four reactors in series, of the moving bed type; the regeneration of the catalyst is carried out on the outflow from the fourth reactor. The reaction space according to the invention thus consists of four catalytic zones. The reactors are of the "radial" type as indicated in FIG. 3.

Operating conditions:

The catalyst is distributed over the reactors in the following proportions: 1$^{st}$ reactor:10%; 2$^{nd}$ reactor: 20%; 3$^{rd}$ reactor:30%; 4$^{th}$ reactor:40%; the total catalyst amount is 37,000 kg.

The catalyst is withdrawn from each reactor at a rate of 310 kg per each four hours.

The H$_2$ flow rate in the lifts 8, 13, 18, 23 is 15 kg/h.

The regeneration is carried out in three successive stages (with the use of carbon tetrachloride as halogenated compound):

(1) the first stage of coke combustion, in which the inlet temperature of the regenerator is maintained at 440° C., the pressure inside the regenerator at an absolute value of 5 kg/cm$^2$, the oxygen content at the inlet of the reactor at 0.3% by volume, is performed in 1 hour 30 minutes;

(2) the second stage of oxychlorination, for which the temperature is maintained at the inlet of the regenerator at 510° C., the pressure in the regenerator at an absolute value of 5 kg/cm$^2$, the oxygen content at the inlet of the regenerator from 2 to 2.5% by volume, C Cl$_4$ being injected at a flow rate of 3.4 kg/h, is performed in 1 hour;

(3) the third oxidation stage, during which the temperature is maintained at 510° C., the pressure at an absolute value of 5 kg/cm$^2$ and the oxygen content at the inlet of the reactor from 4.5 to 6.0% by volume, is performed in 2 hours.

The reduction of the catalyst is carried out in a compartment at the top portion of the first reactor, the hydrogen flow rate being 25 kg/h, the temperature being maintained at 500° C., and the pressure at an absolute value of 13 kg/cm$^2$.

The fresh catalyst is introduced at the top portion of the first reactor at a rate of 310 kg per each four hours.

EXAMPLE 2

This example relates to the unit illustrated in FIG. 2; the unit comprises four reactors of increasing sizes, 1, 2, 3 and 4; the catalyst is regenerated at the outlet from the reactor 1; the regenerated catalyst is first passed through the reactor 4 of the greatest size, then through reactor 3, then through reactor 2, and then is fed back to reactor 1 where a fresh charge is introduced. Here, the reaction space according to the invention also consists of four catalytic zones. The reactors are of the "radial type".

Operating conditions:

The catalyst is distributed over the reactors in the following proportions: 1$^{st}$ reactor: 10%, 2$^{nd}$ reactor: 20%; 3$^{rd}$ reactor: 30%; 4$^{th}$ reactor: 40%; the total catalyst amount is 38,000 kg.

The catalyst is withdrawn from each of the reactors at a rate of 270 kg per each four hours.

The H$_2$ flow rate in lifts 8, 13, 18 and 23 is 15 kg/h.

The operating conditions used for regenerating the catalyst are the same as in example 1.

The reduction of the catalyst is carried out in a compartment placed at the top of the fourth reactor; the operating conditions are the same as in example 1.

The fresh catalyst is introduced at the top of the first reactor at a rate of 270 kg per each four hours.

EXAMPLE 3

Example 1 is repeated, except that instead of withdrawing the catalyst at a rate of 310 kg per each 4 hours, it is withdrawn continuously at a rate of 75 kg per hour.

EXAMPLE 4

(This example forms no part of the invention and is only given by way of comparison).

There are used four reactors with fixed bed catalysts connected in series, the assembly of the reactors (and accordingly the unit) being stopped at regular intervals (of several months) in view of regenerating the catalyst by any conventional means.

The four reactors have increasing catalyst volumes according to the following proportions: 1$^{st}$ reactor:10%; 2$^{nd}$ reactor:20%; 3$^{rd}$ reactor:30%; 4$^{th}$ reactor:40%;

The total catalyst amount is 37,500 kg.

RESULTS obtained in examples 1 to 4.

It is apparent from the preceding examples that the first advantage of operating according to one embodiment of the invention, is the possibility of operating under a much lower pressure than in the prior embodiments. As a matter of fact, as it has been stated above, in each of examples 1 to 3, the average pressure in the reaction zones is only 11 kg/cm$^2$ instead of 16 kg/cm$^2$ in the comparative example. As a result of this pressure decrease and of the fact that the catalyst is used at a better level of activity and selectivity, it has been observed an average increase of the yield of reformate, at the outlet of the last reaction zone traversed by the charge, of 3.0% (by weight with respect to the charge) in examples 1, 2 and 3, with respect to the yield obtained in the comparative example. A 3% yield increase with respect to the comparative example relating to the average purity of hydrogen in the purge gas, has also been observed, in examples 1, 2 and 3.

In addition, the practical advantage of the system according to the invention, is in the fact that the system optionally gives means for initially operating with a conventional system of reactors and an usual implantation. It is accordingly possible to conceive a unit which, in a first time, is operated in a conventional manner but which, in a second time, after some modifications of the arrangements, is adapted to the circulation and permanent regeneration of the catalyst, according to the invention, these modifications resulting moreover in a very clear improvement of the results.

On the other hand, one of the other advantages of the process, depending on the use of a recycle gas in the lifts (this other advantage appearing in processes making use of an installation such as that illustrated in FIG. 1) makes possible to avoid the use of valves for withdrawing the catalyst from each one of the reactors.

EXAMPLE 5

This example illustrates the process of the invention as applied to the treatment of a steam-cracking gasoline.

The starting product or charge is a steam-cracking gasoline having the following composition by weight:

| | |
|---|---|
| - Paraffins | 1.8% |
| - Monoolefins | 6.8% |
| - Aromatics | 69.4% |
| - Naphthenes | 6.9% |
| - Diolefins | 6.8% |
| - Cycloolefins | 3.2% |
| - Alkenylaromatics | 5.1% |

Since this gasoline is unsaturated, it has been previously treated in a unit for selective hydrogenation, in the presence of a nickel/alumina catalyst of 10% nickel content, the operating conditions being as follows:

Temperature: 140° C.

Absolute pressure: 28 kg/cm$^2$

Hourly flow rate by volume: 2 volumes per volume of

Hydrogen partial pressure: 12 kg/cm$^2$ catalyst

Molar ratio hydrogen/hydrocarbons: 0,5 at the reactor inlet

The product withdrawn from the reactor is fractionated in the following manner:

A light cut (mainly C$_5$) is removed at the top of the column; its maleic anhydride value is lower than 13; it may therefore be admixed with gasoline and used as fuel or as a starting material for petrochemical applications.

A C9+ cut is recovered from the bottom of the column; its maleic anhydride value is lower than 5; it may also be used as fuel, or as starting material for petrochemical applications.

The intermediary C6–C8 cut had the following composition:

|  |  |
|---|---|
| - Monoolefins | 4% |
| - Benzene | 38.8% |
| - Toluene | 26.5% |
| - Xylenes | 15.9% |
| - Ethylbenzene | 5.3% |
| - Paraffins | 1.9% |
| - Naphthenes | 7.6% |
| - Sulfur content | 380 ppm |

This intermediary cut is used, together with hydrogen, for feeding the reactor of a second unit, this reactor contains 2 beds of catalyst comprising cobalt and molybdenum, deposited on alumina having an average specific surface of 50 m$^2$/g. The first bed corresponds to ¼ of the total catalyst volume and the second bed to ¾ of this volume.

The operating conditions are as follows:
Temperature: 340° C.
Total pressure: 40 kg/cm$^2$
Feeding hourly flow rate by volume: 4 volumes per volume of catalyst
Hydrogen partial pressure: 18 kg/cm$^2$ After evolution of the normally gaseous constituents, i.e. hydrogen and the impurities contained therein (methane, ethane, propane), and of the hydrogen sulfide, the product withdrawn from the reactor had the following composition:

|  |  |
|---|---|
| - Monoolefins | 0% |
| - Benzene | 38.4% |
| - Toluene | 26.6% |
| - Xylenes | 15.3% |
| - Ethylbenzene | 5.1% |
| - Paraffins | 5.8% |
| - Naphthenes | 8.8% |
| - Sulfur content | 2 ppm by weight |

A more detailed composition by weight of this product is as follows:

| PARAFFINS | | |
|---|---|---|
| C5 | 0.05% | |
| C6 | 1.87% | |
| C7 | 2.21% | 5.80% |
| C8 | 1.37% | |
| C9 | 0.30% | |

| NAPHTHENES | | |
|---|---|---|
| C5 | 0.18% | |
| C6 | 4.76% | |
| C7 | 2.44% | 8.84% |
| C8 | 0.89% | |
| C9 | 0.57% | |

| AROMATICS | | |
|---|---|---|
| Benzene | 38.38% | |
| Toluene | 26.58% | 85.36% |
| Ethylbenzene | 5.10% | |
| Xylenes | 15.30% | |

This feed charge is then passed, together with hydrogen, through two conventional fixed bed reactors (this is not an operation according to the invention) containing a catalyst consisting of 0.5% by weight of platinum, 0.1% by weight of iridium and 1.4% by weight of chlorine deposited on alumina balls having a 230 m$^2$/g specific surface, under the following operating conditions:
Pressure: 10 kg/cm$^2$
Temperature at the top of the catalyst bed: 560° C.
Hourly flow rate by volume of the liquid charge per volume of catalyst: 3
Molar ratio hydrogen/feed: 5

The product, issued from the reactor, had the following composition by weight:

|  |  |  |
|---|---|---|
| - Hydrogen | 0.81% | |
| - Methane | 0.84% | |
| - Ethane | 1.00% | |
| - Propane | 1.46% | |
| Σ - Butanes | 1.55% | |
| Σ - Pentenes | 0.02% | |
| Σ - Pentanes | 1.15% | |
| Σ - Hexanes | 0.28% | |
| Σ - Heptanes | 0.050% | |
| Σ - Octanes | 0.003% | |
| - Cyclohexane | 0.003% | |
| - Methylcyclopentane | 0.044% | |
| - Benzene | 42.65% | |
| - Toluene | 30.90% | |
| - Ethylbenzene | 3.24% | 92.79% |
| Σ - Xylenes | 15.55% | |
| ΣC9 - Aromatics | 0.35% | |
| ΣC10 - Aromatics | 0.10% | |

The increase of the aromatics production is 7.43 kg per 100 kg of treated charge, comprising 4.27 kg of benzene, 4.32 kg of toluene and 0.25 of xylenes; the ethylbenzene consumption amounts to 1.86 kg.

The products obtained at the outlet of the second reactor containing the catalyst of platinum and iridium, after removal of their gaseous constituents, are fractionated in a column corresponding to 40 theoretical plates, as described for example, in the French patent application No. 71/13 859 filed on Apr. 19, 1971. Three cuts have thus been separated: benzene, toluene and xylenes. The characteristics of the benzene cut were as follows:
Cristallization point: 5.41° C.
Non-aromatics: 810 ppm In the preceding operating conditions, there is carried out a test of long duration in order to determine the catalyst life time.

After a run of 200 hours, the non-aromatic impurities content of the obtained benzene was 1,380 pp,; after 850 hours, it was 2,750 ppm; and after 1,900 hours, it was 4,600 ppm.

In order to operate in conformity with the invention, the two conventional fixed bed reactors, as used above, are then replaced by two radial reactors from which there is withdrawn, about each 8 hours, the sixtieth part by weight of the catalyst contained in each reactor; all other operating conditions (temperature, pressure, flow rates etc . . . ) are kept unchanged. The catalyst, used in grains, contains the same constituents as mentioned above (platinum, iridium, chlorine and alumina) in the same proportions. The catalyst, withdrawn from the first reactor wherethrough the charge is passed, is conveyed, by means of a lift device, to the top portion of the second reactor; the catalyst, withdrawn from the bottom of the second reactor, is conveyed, by means of a mechanical lift device, to an "accumulator-decantor" flask wherein the conveyor gas recycle hydrogen is separated from the catalyst. The spent catalyst accumulates in the accumulator-decantor" flask before being supplied to a regenerator placed below this flask: at regular intervals, the pressure prevailing in the regenerator is adjusted to that of the "accumulator-decantor" flask.

It is then filled up with a catalyst withdrawn from the "accumulator-decantor" flask through a valves system, then isolated from the rest of the system. Optionally, the regenerator is scavenged with nitrogen in order to remove the hydrocarbons entrained in the lift. Then the regeneration is performed in three successive stages in fixed bed:

1. In the first stage of coke combustion, the temperature, at the inlet of the regenerator, is maintained at 440° C., the pressure in the regenerator at 5 kg/cm² absolute, the oxygen content at the reactor inlet at 0.3% by volume, the operation time being 1 hour 30 minutes.

2. In the second stage of oxychlorination, the temperature is maintained at the inlet of the regenerator at 510° C., the regenerator pressure at 5 kg/cm² absolute, the oxygen content at the regenerator inlet being from 2 to 2.5% by volume and the injection of CCl₄ being performed at a rate of 3.4 kg/h. The operating time of this second stage is one hour.

3. In the third stage of oxidation, the temperature is maintained at 510° C., the pressure at 5 kg/cm² absolute, the oxygen content at the inlet of the reactor being from 4.5 to 6.0% by volume, and the operation time being 1 hour.

After this third stage, the regenerator is scavenged with nitrogen, then equilibrated in pressure with the first of the two reactors traversed by the charge. The catalyst is transferred, by means of a lift, from the regenerator to this reactor. At the top of said reactor, in a separate compartment, the catalyst is reduced by a hydrogen stream (hydrogen flow rate: 25 kg/h), at 500° C., under a pressure of 13 kg/cm² absolute. Then, about every 8 hours, a fresh catalyst amount equivalent to about one sixtieth of the total catalyst mass contained in the reactor, is introduced therein.

By operating in these conditions, the aromatic production is substantially the same that when operating with 2 catalyst fixed beds, but after a run of 200 hours, the non-aromatic impurity content of benzene was 700 ppm, after 850 hours it was 900 ppm and after 1,900 hours, 1,050 ppm.

EXAMPLE 6

In order to produce benzene, toluene and xylenes, a gasoline having the following characteristics, is treated:

| - ASTM distillation | 76° C.-161° C. |
|---|---|
| - D⁴₂₀ | 0.739 |
| - Paraffins | 59.74% by volume |
| - Naphthenes | 30.44% by volume |
| - Aromatics | 9.82% by volume |

This charge is circulated successively through three reactors R, R', 1 and 4. The corresponding unit is illustrated in FIG. 4.

Figure 4:
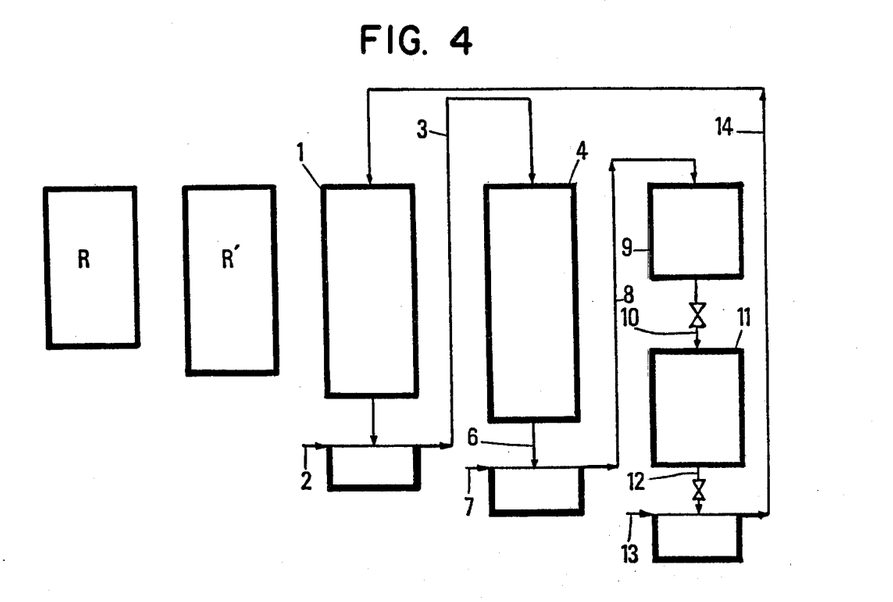

FIG. 4 is only a diagrammatical view since the principle is easy to understand. Two reactors R and R' are operated with a fixed bed, the third and fourth reactors 1 and 4 are of the "moving bed" type. The charge, the path of which is not shown, passes successively through the reactor R, the reactor R', the reactor 1 and finally the reactor 4. (The reaction space according to the invention is accordingly, in this case, constituted of two catalytic zones which are reactors 1 and 4).

Between two adjacent reactors, the charge passes through heating means.

In the reactor 4, the catalyst issued from reactor 1 and conveyed through the lift 3 is introduced at the top portion of reactor 4 and is withdrawn through pipe 6 and conveyed towards an accumulator flask 9 through lift 8, whose driving fluid is recycle hydrogen from the reaction zone, introduced through line 7. The regeneration step is conducted in compartment 11, and is performed exactly as explained in example 1. The regenerated catalyst is fed back to the reactor 1 through lift 14. Before reaching reactor 1, the catalyst is subjected to a reduction in a compartment not shown on the figure. The catalyst used in each of the reactors contains 0.35% by weight of platinum with respect to the carrier, which is alumina having a specific surface of 240 m²/g and a pore volume of 57 cc/g. The catalyst further contains 0.05% by weight of iridium. The chlorine content of this catalyst is 1%.

The charge is first treated in the two reactors R and R' under the following operating conditions:

Pressure: 15 bars
Charge flow rate: 3 kg per kg of catalyst and per hour
Molar ratio hydrogen/hydrocarbon: 5
Temperatures:
  in the first reactor R: inlet temperature 500° C.
    outlet temperature 472° C.
  in the second reactor R': inlet temperature 500° C.
    outlet temperature 495° C.

The product issued from reactor R' had the following composition:

| - Hydrogen | 1.83 |
|---|---|
| - Methane | 0.21 |
| - Ethane | 0.34 |
| - Propane | 2.73 |
| - Isobutane | 1.76 |
| - n butane | 2.25 |
| - Isopentane | 2.65 |
| - n pentane | 1.76 |
| - isohexanes | 8.66 |
| - n hexane | 3.78 |
| - Isoheptanes | 6.05 |
| - n heptane | 1.97 |
| - Isooctanes | 5.99 |
| - n octane | 1.57 |
| - Isononanes | 2.61 |
| - n nonane | 0.68 |
| - Methylcyclopentane | 0.96 |
| - Cyclohexane | 0.14 |
| - Methylcyclohexane | 0.25 |
| - Σ di methylcyclopentanes | 1.02 |
| - C₈ Naphthenes | 1.60 |
| - C₉ Naphthenes | 0.63 |
| - Benzene | 2.96 |
| - Toluene | 11.92 |
| - Ethylbenzene | 4.10 |
| Σ - Xylenes | 16.63 |
| Σ - C₉ aromatics | 12.45 |
| Σ - C₁₀⁺ aromatics | 2.50 |

-continued

| | |
|---|---|
| | 100.00 |

The product issued from the second reactor is sent to and treated in the third and fourth reactors operating according to the regenerative system. The operating conditions in reactors 1 and 4 were as follows:
Pressure: 10 bars
Charge flow rate: 3.5 kg per kg of catalyst per hour
Molar ratio hydrogen/hydrocarbon: 5
Inlet temperature: 520° C.
Outlet temperature: 510° C.

The catalyst is withdrawn constinuously from each one of reactors 1 and 4 at an hourly rate of about 1/400 part of the total catalyst mass of each reactor 1 and 4.

The product issued from the reactor had the following composition by weight:

| | |
|---|---|
| - hydrogen | 2.50 |
| - methane | 2.22 |
| - ethane | 2.17 |
| - propane | 6.07 |
| - isobutane | 3.94 |
| - n butane | 5.66 |
| - isopentane | 3.63 |
| - n pentane | 1.52 |
| - isohexanes | 1.86 |
| - n hexane | 1.23 |
| - isoheptanes | 0.76 |
| - n heptane | 0.14 |
| - isooctanes | 0.04 |
| - n octane | 0.12 |
| - isononanes | — |
| - n nonane | — |
| - methylcyclopentane | 0.30 |
| - cyclohexane | 0.05 |
| - methylcyclohexane | — |
| - Σ dimethylcyclopentanes | — |
| - C$_8$ naphthenes | — |
| - C$_9$ naphthenes | — |
| - benzene | 7.98 |
| - toluene | 23.69 |
| - ethylbenzene | 2.11 |
| Σ - xylenes | 21.46 |
| Σ - C$_9$ aromatics | 9.60 |
| Σ - C$_{10}$+ | 2.95 |
| | 100.00 | which means a production of 53.13 kg of benzene, toluene and xylenes per 100 kg of initial charge.

It has been mentioned above that for moving the catalyst, for example from the bottom of the reaction space to the top of the regeneration device or to the top of another reaction space, there are used raising devices of the "lift" type in which the driving fluid, which may be an inert gas such as nitrogen, may also be hydrogen and more particularly recycle hydrogen issued from the reaction space; it had also been indicated that the hydrogen used as driving fluid is preferably at a temperature from 150° to 550° C. in order to avoid thermal shocks on the catalyst. By making use of hot hydrogen, it is also possible to use a smaller amount thereof since hot hydrogen occupies a larger volume than cold hydrogen.

It must be emphazised that one of the objects of the present invention also relates to a particular process for the admission of the recycle hydrogen used as driving fluid into the vessel placed below each catalytic reaction zone and through which flows the catalyst progressively withdrawn from each reaction zone. Hereinafter, such a vessel will be named "lift pot" or still "raising pot". In the present improved embodiment, the driving fluid is thus recycle hydrogen (generally containing from about 60 to about 95% by volume of hydrogen and from 40 to 5% by volume of impurities consisting essentially of light hydrocarbon fractions such as methane, ethane, propane, isobutane, normal butane, isopentane and normal pentane); the driving fluid is at a temperature from about 150° to 550° C.; its pressure being close to the outflow pressure of the recycling compressor, and from about 5 to 20 kg/cm$^2$.

The improved process according to the invention comprises (see FIG. 5) dividing the driving fluid conveyed through pipe 2 in two flows, before its introduction into the raising pot 6. A first flow, hereunder referred to as "primary hydrogen" is permanently introduced into the bottom of the raising pot 6, through pipe 2 A (substantially parallel to the axis of the raising pot) and is used as driving gas for the solid particles of catalyst admitted into the raising pot 6 through pipe 1. The solid particles are then carried away through the lift 5. A second flow, which is called "secondary hydrogen" is introduced through pipe 2 B, opening in the lateral wall of the raising pot 6 and in the lower part of this lateral wall. Generally, the pipe 2 B opens in the lateral wall at a height within the interval from x/2 and x/5, x being the total height of the raising pot, and the height of the pipe 2 B being measured from the bottom of the raising pot 6; the "secondary hydrogen" jet is so oriented that the solid driven by the secondary hydrogen stream, reaches the axis of the "primary hydrogen" flow and then may be raised up in the raising tube (lift) 5; the pipe 2 B is inclined with respect to the axis of the raising pot 6, by an angle generally from 45° to 90° C. The flow rate of the gas introduced into the raising tube 5 is maintained constant by means of a conventional regulation device. The primary and secondary hydrogen flow rates are also regulated through valves 3 and 4.

Figure 5:
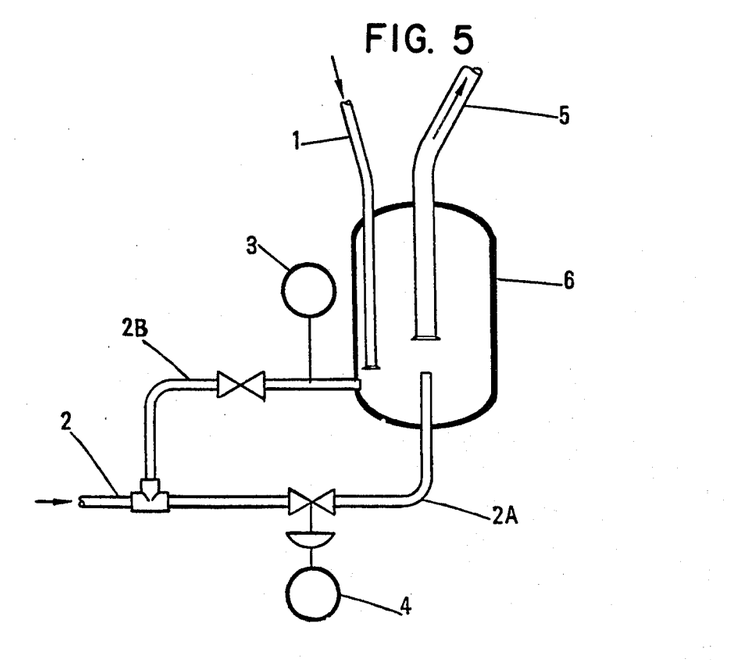

The catalyst, driven by the driving fluid, is destined to feed either the regeneration zone, or another reaction space. When the desired catalyst level is attained, in the regeneration zone or in the other reaction space, the catalyst raising through lift 5 is then stopped by closure of the "secondary hydrogen" inlet, the primary hydrogen stream being never stopped during the normal operation of the unit (during the closure of the secondary hydrogen admission, the catalyst thus forms a slope under the inlet pipe 1 for the catalyst which slope prevents the catalyst from being carried away through lift 5).

Thus, by means of the present device for sharing the driving flowing stream in two streams, it is possible to preliminarily adjust in only one operation, the "primary hydrogen" flow rate. The so-regulated system is always in condition for operation. Moreover, when the catalyst no longer circulates through the lift, the hot "primary hydrogen" stream, which is never stopped, makes it possible to maintain hot the lift 5 and accordingly, to avoid in the subsequent operations thermal shocks on the catalyst, when the latter is again entrained through the lift.

According to another improvement of the invention, the driving fluid (recycle hydrogen), as well as the different gases used during the regeneration, may be advantageously heated by thermal exchange with at least one part of the effluent from the last catalyst zone of the reaction space.

What we claim is:

1. A process for the continuous conversion of hydrocarbons, in the presence of a granular catalyst containing a carrier and at least one metal selected from the group consisting of metals from groups VI a, VII a and VIII of the periodic classification of the elements, comprising circulating a charge formed of hydrogen and hydrocarbons through a reaction space comprising at least two elementary catalytic zones, connected in series, substantially vertical and placed side by side, each of them being of the moving bed type, the charge circulating successively through each zone and the catalyst also passing successively through each zone and moving continuously downwardly therethrough, continuously withdrawing the catalyst from the bottom of the last catalytic zone, passing resultant withdrawn catalyst to an accumulator, and from the accumulator sending the catalyst to a fixed bed regeneration zone, isolating the fixed bed regeneration zone from the process during regeneration, the catalyst in the regeneration zone where, forming a fixed bed, it is successively subjected in the form of said fixed bed (a) to a combustion by means of a gas containing molecular oxygen whose oxygen content by volume is from 0.01 to 1%, (b) to an oxychlorination by means of a gas containing molecular oxygen whose oxygen content by volume is from 1 to 3% and simultaneously by means of at least one alkyl halide, and (c) to a final oxidation treatment by means of an oxygen-containing gas whose oxygen content by volume is from 3 to 20%, passing resultant regenerated catalyst to a reducing zone and from which the reduced catalyst is progressively reintroduced into the upper part of the first catalytic zone of the reaction space so as to maintain a substantially constant high level of activity in each point of the catalytic zones, and wherein said granular catalyst, progressively withdrawn from one reaction space, is introduced in a lifting pot from where it is sent to a regeneration zone or to another reaction space, by lift means whose driving fluid consists essentially of recycle hydrogen, introduced through the lifting pot, in which the hydrogen stream, before being introduced into the lifting pot is subdivided in two flows defined as "primary hydrogen" and "secondary hydrogen", the "primary hydrogen" being introduced permenently through the bottom of the lifting pot, the "secondary hydrogen" supplied intermittently to the raising pot for insuring the catalyst raising, being introduced through a duct opening into the lateral wall of the lifting pot, and in the lower portion of said lateral wall, the so-formed system acting as a valve for causing the catalyst circulation and interrupting the same.

2. A process according to claim 1, wherein the recycle hydrogen is at a temperature of 150°–550° C.

3. A process according to claim 1, wherein said recycle hydrogen is at about 5–20 kg/cm$^2$ in pressure.

4. A process according to claim 1, wherein the recycle hydrogen contains about 60 to about 95% by volume of hydrogen and from 40–5% by volume of impurities consisting essentially of light hydrocarbon fractions.

5. A process according to claim 2, wherein the recycle hydrogen contains about 60 to about 95% by volume of hydrogen and from 40–5% by volume of impurities consisting essentially of light hydrocarbon fractions.

6. A process according to claim 2, wherein the rcycle hydrogen is heated by thermal exchange with at least one part of the effluent from the last catalyst zone of the reaction space.